United States Patent
Islam (10) Patent No.: US 9,530,544 B2
(45) Date of Patent: Dec. 27, 2016

(54) SHIELDED ELECTRICAL CONDUCTOR FURCATION ASSEMBLY

(71) Applicant: CommScope Technologies LLC, Hickory, NC (US)

(72) Inventor: Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 541 days.

(21) Appl. No.: 13/791,248

(22) Filed: Mar. 8, 2013

(65) Prior Publication Data

US 2014/0138151 A1    May 22, 2014

Related U.S. Application Data

(60) Provisional application No. 61/728,020, filed on Nov. 19, 2012.

(51) Int. Cl.
| | |
|---|---|
| *H01R 43/00* | (2006.01) |
| *H01B 13/00* | (2006.01) |
| *G02B 6/44* | (2006.01) |
| *H01B 11/22* | (2006.01) |
| *H02G 1/08* | (2006.01) |
| *H02G 15/013* | (2006.01) |

(52) U.S. Cl.
CPC .............. *H01B 13/00* (2013.01); *G02B 6/4416* (2013.01); *G02B 6/4471* (2013.01); *H01B 11/22* (2013.01); *G02B 6/4472* (2013.01); *H02G 1/081* (2013.01); *H02G 15/013* (2013.01); *Y10T 29/49117* (2015.01); *Y10T 29/49826* (2015.01)

(58) Field of Classification Search
CPC ....... G02B 6/3833; G02B 6/42; G02B 6/4416; G02B 6/36; G02B 6/403; G02B 6/4471; H01B 11/22; H01B 13/00; H02G 1/081; H02G 15/013; Y10T 29/49117; Y10T 29/49826
USPC ...... 29/825, 857, 428; 385/76, 86, 101, 134, 385/100, 109, 99; 174/71 R
See application file for complete search history.

(56) References Cited

U.S. PATENT DOCUMENTS

| | | | | |
|---|---|---|---|---|
| 4,196,965 A | * | 4/1980 | Matsuno | G02B 6/2558 385/96 |
| 5,915,055 A | | 6/1999 | Bennett et al. | |
| 6,049,647 A | * | 4/2000 | Register | G02B 6/4416 385/100 |

(Continued)

OTHER PUBLICATIONS

Sung Chul Kang, International Search Report for PCT/US13/61322, Jan. 16, 2014, Daejeon Metropolitan City, Republic of Korea.

(Continued)

*Primary Examiner* — Peter DungBa Vo
*Assistant Examiner* — Azm Parvez
(74) *Attorney, Agent, or Firm* — Myers Bigel, P.A.

(57) ABSTRACT

A furcation assembly for electrical conductors of an electro-optical cable with electrical conductors and optical conductors has an inner tube surrounded by a metallic shield layer and a polymer jacket surrounding the metallic shield layer. The inner tube may have a circular or a generally ovaloid cross section inner diameter. A transition housing may be applied over an interconnection between the metallic shield layer and a metallic shield of the electro-optical cable. A pull strand may be provided in the inner tube inner diameter, for ease of insertion of the electrical conductors and/or additional water proofing characteristics.

4 Claims, 8 Drawing Sheets

(56) References Cited

U.S. PATENT DOCUMENTS

| | | | |
|---|---|---|---|
| 6,326,550 B1 | 12/2001 | Dyer et al. | |
| 6,389,214 B1 | 5/2002 | Smith et al. | |
| 6,738,555 B1 | 5/2004 | Cooke et al. | |
| 7,409,127 B1 | 8/2008 | Hurley et al. | |
| 7,903,925 B2 | 3/2011 | Cooke et al. | |
| 7,955,004 B2 * | 6/2011 | DiMarco | G02B 6/4471 385/100 |
| 8,155,490 B2 | 4/2012 | de Jong et al. | |
| 8,267,596 B2 | 9/2012 | Theuerkorn | |
| 2004/0197066 A1 | 10/2004 | Daoud | |
| 2005/0276551 A1 | 12/2005 | Brown et al. | |
| 2006/0120672 A1 | 6/2006 | Cody et al. | |
| 2007/0110384 A1 | 5/2007 | Cody et al. | |
| 2008/0138026 A1 | 6/2008 | Yow et al. | |
| 2010/0092135 A1 | 4/2010 | Barker et al. | |
| 2010/0098386 A1 | 4/2010 | Kleeberger | |
| 2011/0033156 A1 * | 2/2011 | Sanghera | B29D 11/00682 385/76 |
| 2011/0243514 A1 | 10/2011 | Nave | |
| 2013/0336623 A1 * | 12/2013 | Chamberlain | G02B 6/4416 385/101 |

OTHER PUBLICATIONS

Extended European Search Report for EP Application No. 13855463.9 dated Dec. 9, 2015, 5 pages.

* cited by examiner

SHIELDED ELECTRICAL CONDUCTOR FURCATION ASSEMBLY

BACKGROUND

Field of the Invention

This invention relates to hybrid electrical and optical cable assemblies. More particularly, the invention relates to a shielded furcation assembly for electrical conductors of a hybrid electro-optical cable.

Description of Related Art

The wireless communications industry is changing from traditional signal delivery from ground based transceivers delivering/receiving the RF signal to/from the antenna atop the radio tower via bulky/heavy/high material cost metal RF coaxial cable to optical signal delivery to a tower top mounted transceiver known as a remote radio unit (RRU) or remote radio head (RRH) with implementation of fiber to the antenna (FTTA) cabling.

Figure 1:
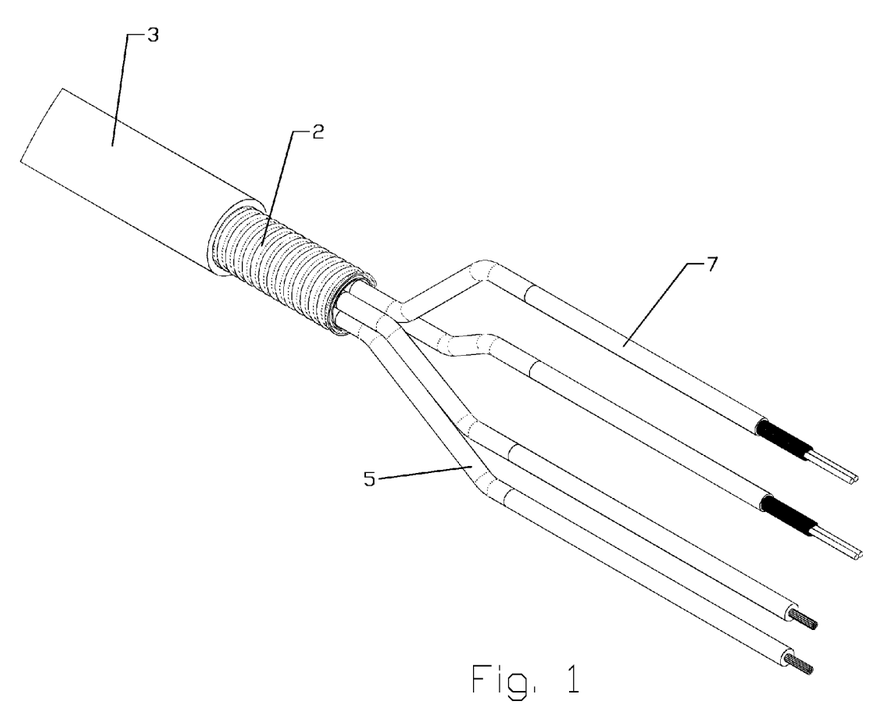
FIG. 1 is a schematic isometric view of an exemplary electro-optical hybrid cable.

FTTA cabling may be simplified where power and/or control signal conductors are provided with optical signal conductors in a single hybrid electro-optical cable 3. An FTTA cable, for example as shown in FIG. 1, may include a metallic shield 2 surrounding multiple electrical conductors 5 and single or multiple optical conductor (fibers) 7 in a subunit. A fiber subunit may include multiple optical fibers (such as 250 um or 900 um). Optical conductors may be fragile, requiring great care to properly terminate.

Prior hyrbrid cable RRU/RRH terminations have employed an over voltage protection and/or distribution box for terminating each of the electrical and optical conductors as individual jumpers. These additional enclosures require field termination of the several conductors atop the radio tower, increasing installation time and labor requirements. Further, each break in the conductors provides another opportunity for signal degradation and/or environmental fouling. Standardized electrical interconnection interfaces of the RRU/RRH equipment may include shielded connector interfaces to isolate the power conductors from lighting strike and/or the RRU/RRH equipment from electro-magnetic interference (EMI) that the electrical conductors may generate.

Factory terminated hybrid cable assemblies are known. However, these assemblies may apply splices to the conductors, require a relatively large in-line break-out/splice enclosure and/or utilize environmental seals which fail to positively interlock the jumpers therewith, which may increase the potential for cable and/or individual conductor damage to occur.

Furcation tubes may be applied to fibers and or fiber bundles stripped back from the cable end to protect the optical fibers from damage between the cable and the optical fiber termination. Optical fiber furcation tubes may consist of an inner polymer tube surrounded by a para-aramid synthetic fiber sheath, or a para-aramid synthetic fiber sheath alone.

Therefore, an object of the invention is to provide an electro-optical cable furcation assembly solution that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

In order to connect conductors and/or fibers of an electro-optical cable directly to the RRH, optical fiber and power conductors are separated from the hybrid cable as individual jumpers, the jumpers protected with separate furcation tubes.

The inventor has recognized that although a shielded electro/optical hybrid cable effectively protects the individual conductors therein from damage, without a break-out box or the like proximate the end of the cable, the electrical conductors may be unshielded when transitioning to their individual terminations at the end of the hybrid cable. Therefore, these power conductors may be susceptible to lightning strikes and/or may themselves generate EMI proximate sensitive RRU/RRH equipment or the like.

A transition may be applied proximate the end of a electro-optical cable to break the electrical conductors out into the individual jumpers, without requiring termination and/or or splicing of the individual and/or groups of related conductors, by removing outer protective layers of the hybrid cable and providing protective sheaths for each of the conductors and/or conductor groups.

An exemplary furcation assembly 1 for the electrical conductors 5, as shown for example in FIGS. 2-5, includes an electrical furcation tube 10 comprising a polymer inner tube 15 which is itself surrounded by a metallic shield layer 20. The metallic shield layer 20 may be further surrounded by a polymer jacket 25.

Figures 2, 3:
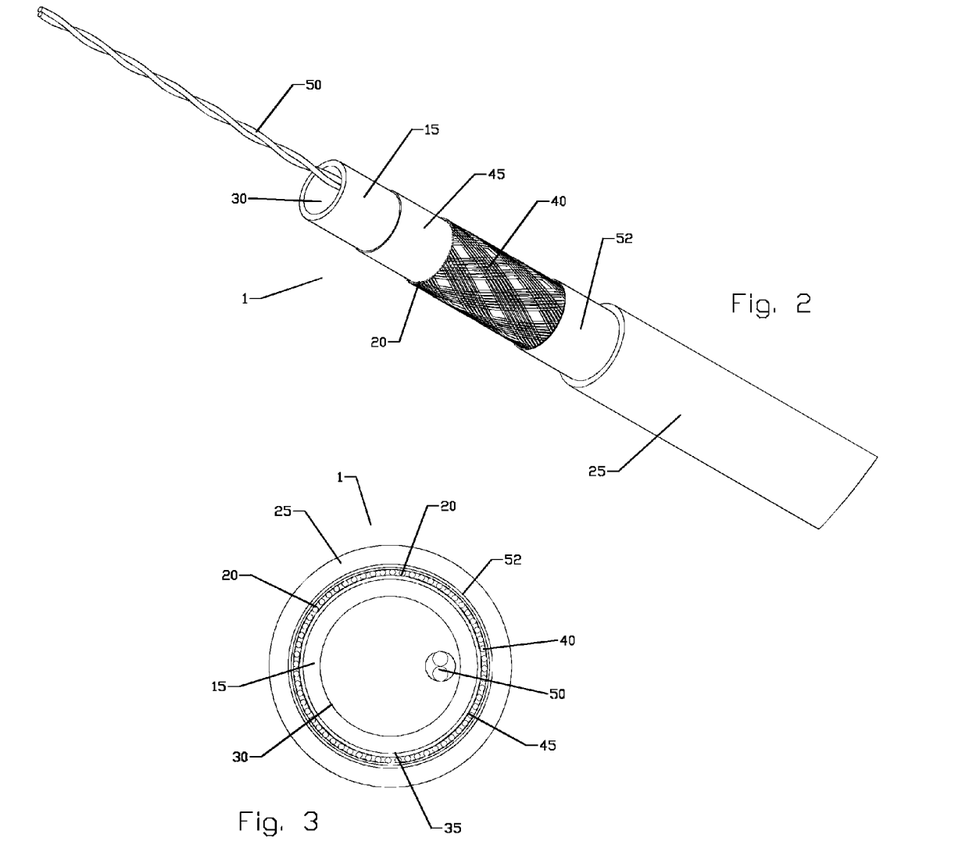
FIG. 2 is a schematic isometric view of an exemplary furcation assembly.
FIG. 3 is an end view of the furcation assembly of FIG. 2.
Figures 4, 5:
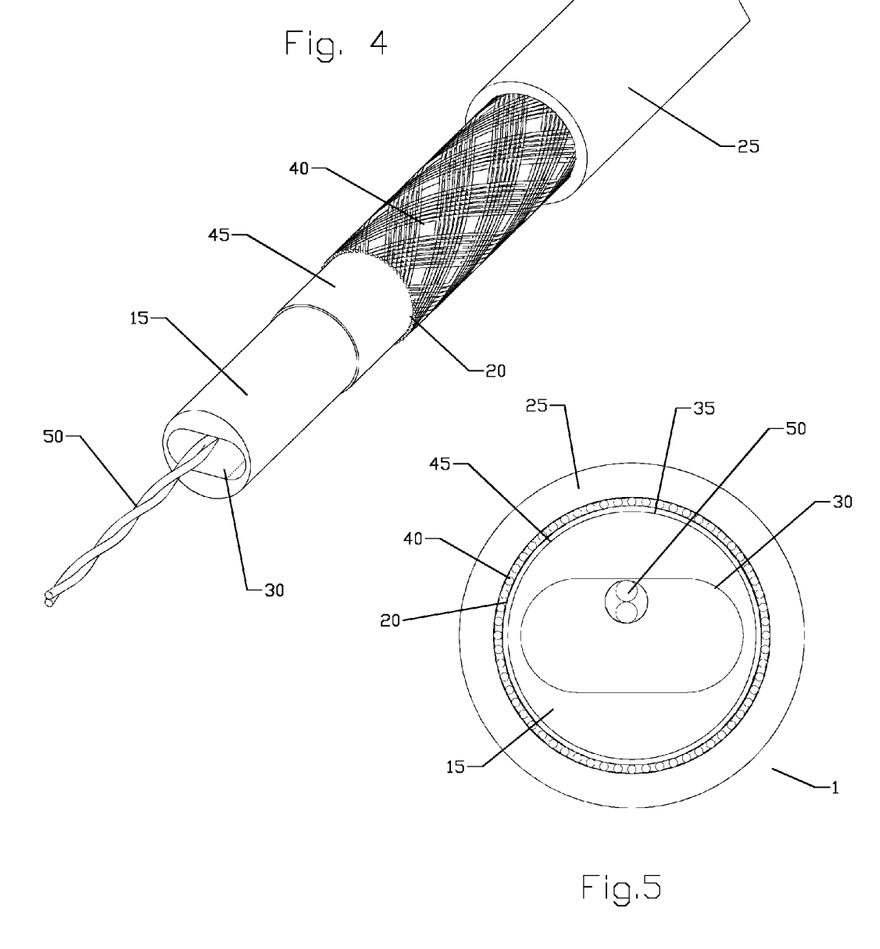
FIG. 4 is a schematic isometric view of an alternative furcation assembly.
FIG. 5 is an end view of the furcation assembly of FIG. 4.
Figures 6, 7:
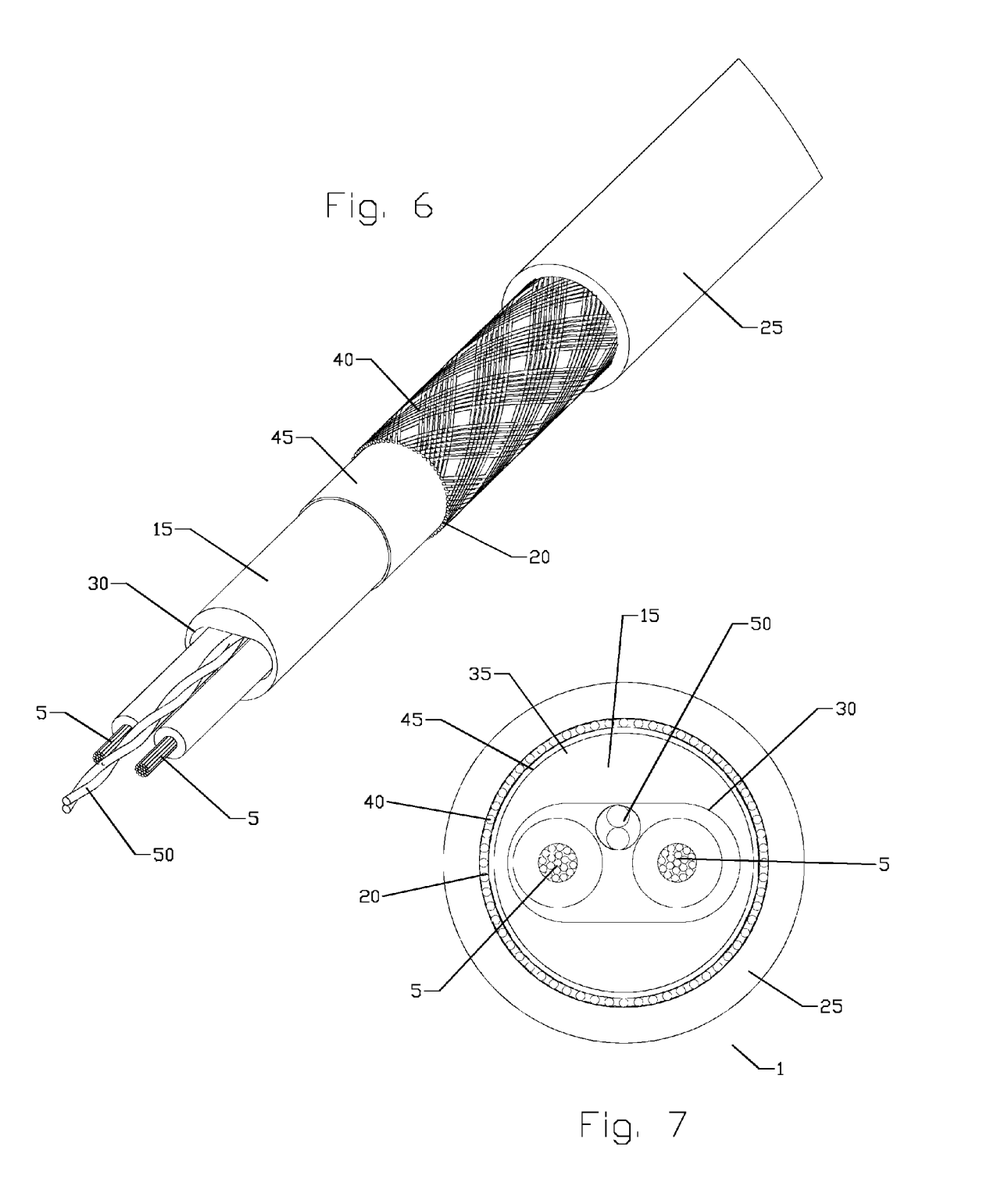
FIG. 6 is a schematic isometric view of the furcation assembly of FIG. 4, with electrical conductors inserted within the inner tube.
FIG. 7 is an end view of the furcation assembly of FIG. 6.

The inner tube 15 may be provided with circular cross section inner and outer diameters 30, 35, as shown for example in FIGS. 2 and 3, providing ease of insertion and space for one or several electrical conductors 5 in a single inner tube 15. To improve support and/or protection of the electrical conductors 5, the inner diameter 30 of the inner tube 15 may be provided with a generally ovaloid cross section approximating the dimensions of two of the electrical conductors 5 aligned side by side one another, for example as shown in FIGS. 6 and 7.

Figure 8:
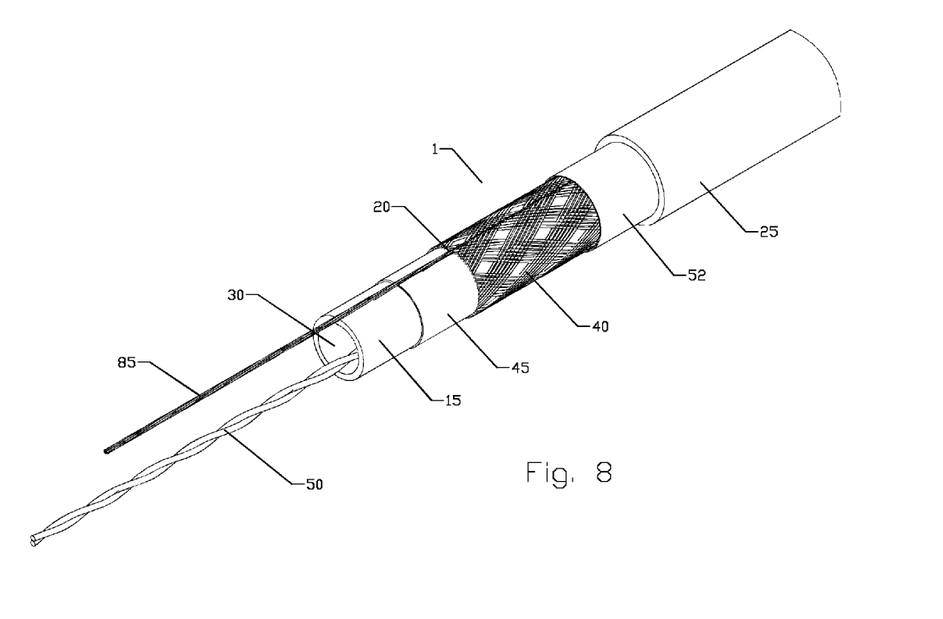
FIG. 8 is a schematic isometric view of an exemplary furcation assembly, including a drain wire in the metallic shield layer.

The metallic shield layer 20 may be provided, for example, as a metallic braid 40 or alternatively as a metallic braid 40 and a metallic foil 45. Further, for example as shown in FIG. 8, a drain wire may be applied to increase a current capacity and/or overall strength of the metallic shield layer 20. Where the metallic foil 45 is provided, a density of the weave of the metallic braid 40 may be reduced, or the metallic braid 40 entirely eliminated, without increasing RF leakage, in a trade-off of overall strength and cost.

A pull strand 50 may be provided in the inner diameter of the inner tube 15, with suitable strength for pulling the electrical conductors 5 through the inner tube 15, for example a para-aramid synthetic fiber or yarn. The pull strand 50 may also be provided with a swell characteristic when wet, enabling the pull strand 50 to swell and seal the inner diameter 30 against additional moisture intrusion. The swell characteristic may be applied via additional fibers of the strand, such as pulp or pulp infused fibers and/or application of a swell agent to the pull strand, for example as a coating or dusting.

A water blocking characteristic of the furcation assembly may be further enhanced by addition of water blocking agents between the metallic shield layer 20 and the jacket 25, such as a water blocking tape layer 52 or a coating also with a swell when wetted characteristic.

Figure 9:
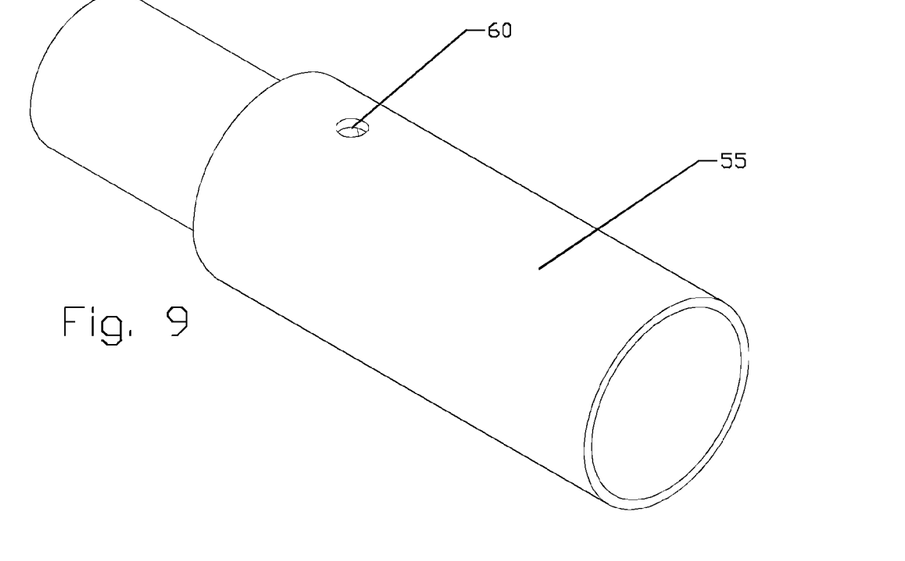
FIG. 9 is a schematic isometric view of an exemplary transition housing.
Figure 10:
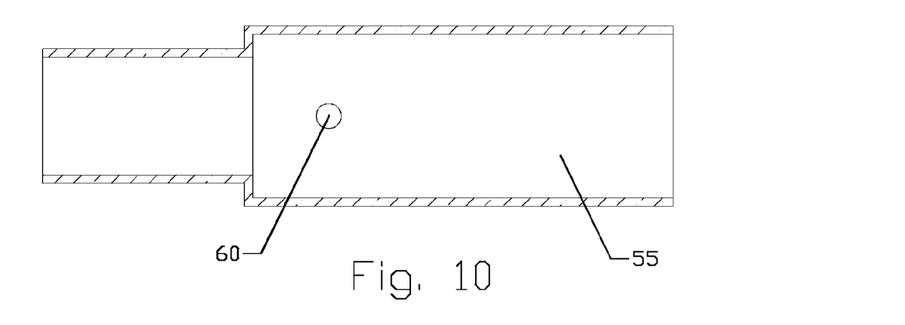
FIG. 10 is a schematic cut-away bottom view of the transition housing of FIG. 9.
Figure 11:
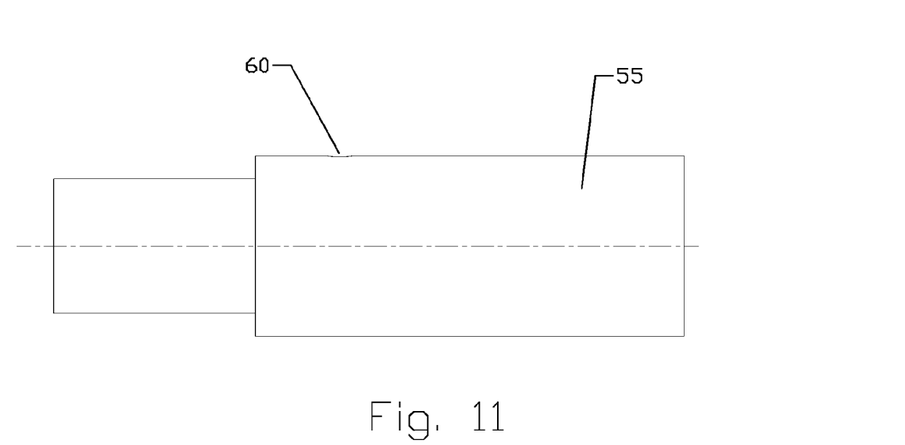
FIG. 11 is a schematic side view of the transition housing of FIG. 9.

A transition housing 55, for example as shown in FIGS. 9-11, may be provided with the furcation assembly 1 to surround the transition of the electro-optical cable 3 to the several furcation tubes. The transition housing 55 may be provided, for example as a polymer or metal material housing with an inner diameter at a first end dimensioned to seat around the outer diameter of the electro-optical cable 3 and an inner diameter at a second end dimensioned to seat around the furcation tubes. To accommodate the increased combined diameter of the furcation tubes, the second inner diameter may be provided greater than the first inner diameter. An injection port 60 may be provided in the sidewall of the transition housing 55, proximate the expected interconnection location, for sealant injection and/or exhaust. The transition housing 55 may be formed, for example, by injection molding, machining and/or insert molding. Alternatively and/or additionally, a portion of shrink tubing may also be provided for enclosing the interconnection and transition housing 55.

To apply the furcation assembly 1, a desired length of the electo-optical cable 3 is stripped back to remove the metallic shield 2 and outer jacket 65, if present, to expose the electrical and optical conductors 5, 7. The optical furcation tubes 70 and the electrical furcation tube 10 are inserted over their respective conductors and the metallic shield layer 20 of the electrical furcation tube 10 is coupled to the metallic shield 2 of the electro-optical cable 3.

Figures 12, 13:
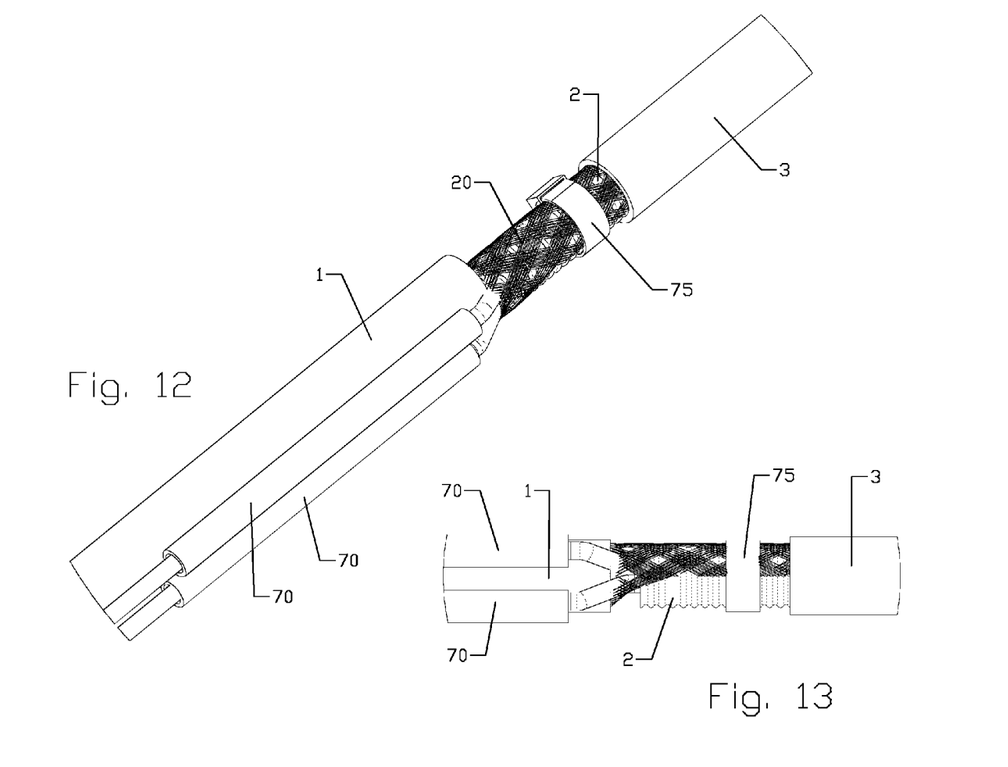
FIG. 12 is a schematic isometric view of a metallic shield layer to metallic shield interconnection between the furcation assembly and an electro-optical cable.
FIG. 13 is a schematic isometric view of an alternative metallic shield layer to metallic shield interconnection between the furcation assembly and an electro-optical cable.

The electro-mechanical coupling between the metallic shield layer 20 and the metallic shield 2 may be, for example, via soldering or the like. Alternatively and/or additionally, a bias clip may 75 be applied, retaining a portion of the metallic shield layer 20 against an outer diameter of the metallic shield 2. The portion of metallic shield layer 20 may be collected into a stub, for example as shown in FIG. 12 or extended to fit around the outer diameter of the metallic shield 2, with the optical furcation tube(s) 70 piercing or passing between a combed portion of the metallic shield layer 20, for example as shown in FIG. 13. Additionally and/or alternatively, the coupling of the metallic shield layer 20 to the metallic shield 2 may be, for example by placing at least a portion of the metallic shield layer 20 over the metallic shield 2 and over wrapping with a metallic foil.

Figure 14:
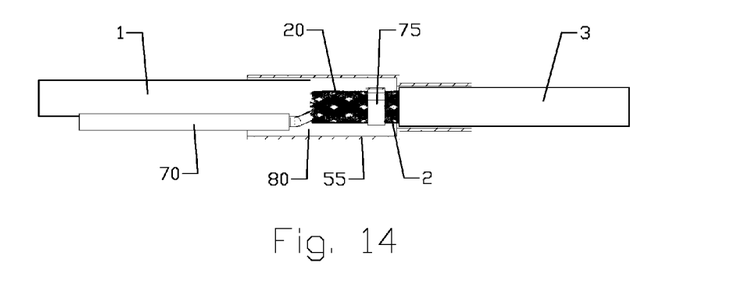
FIG. 14 is a schematic partial cut-away side view of a completed interconnection between the furcation assembly and an electro-optical cable, demonstrating the cavity dimensions to be filled with the sealant.

When the interconnection has been completed, the transition housing 55, previously fitted over the end of the electro-optical cable 3 and advanced along the electro-optical cable 3, can be slid back to the interconnection area, enclosing it, for example as shown in FIG. 14.

Figure 15:
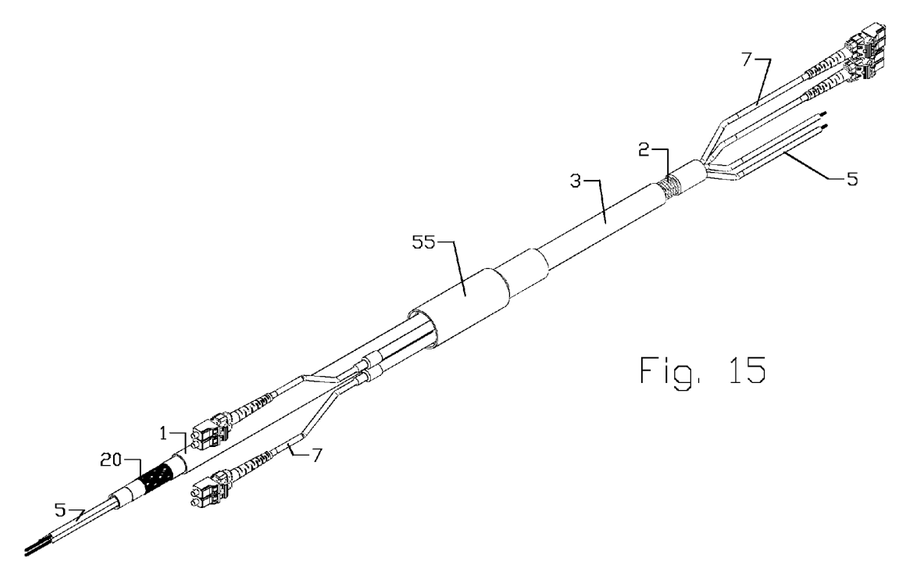
FIG. 15 is a schematic isometric view of an electro-optical cable with furcated electrical and optical conductors.

A cavity 80 between the inner diameter of the transition housing 55 and the metallic shield layer 20 and metallic shield 2 interconnection may be filled with a sealant, through the injection port 60 or at the furcation tube end (and exhausting through the injection port 60) to encapsulate the furcation tube ends with the metallic shield 3 and transition housing 55, forming an integral assembly of furcation tubes and electro-optical cable 3, for example as shown in FIG. 15. The sealant may be, for example, an epoxy with elastomeric properties or the like.

One skilled in the art will appreciate that the electrical conductor furcation assembly enables the splice-free cable conductor distribution of an electro-optical cable that may have improved pull-apart strength, environmental sealing and RF sealing in an assembly with minimal dimensions that eliminates the need for distribution boxes and/or on-site conductor termination during installation.

| Table of Parts | |
|---|---|
| 1 | furcation assembly |
| 2 | metallic shield |
| 3 | electro-optical cable |
| 5 | electrical conductor |
| 7 | optical conductor |
| 10 | electrical furcation tube |
| 15 | inner tube |
| 20 | metallic shield layer |
| 25 | jacket |
| 30 | inner diameter |
| 35 | outer diameter |
| 40 | metallic braid |
| 45 | metallic foil |
| 50 | pull strand |
| 55 | transition housing |
| 60 | injection port |
| 65 | outer jacket |
| 70 | optical furcation tube |
| 75 | bias clip |
| 80 | cavity |
| 85 | drain wire |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail.

Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. A method for furcating an electro-optical cable with a metallic shield surrounding an electrical conductor and an optical conductor, comprising steps of:
   stripping away a length of the metallic shield from an end of the electro-optical cable;
   inserting the electrical conductor through an electrical conductor furcation tube, the electrical conductor furcation tube comprising: a polymer inner tube; the inner tube surrounded by a metallic shield layer, and a polymer jacket surrounding the metallic shield layer; and
   coupling the metallic shield layer to the metallic shield;
   wherein coupling the metallic shield layer to the metallic shield is carried out by at least one of the following:
      soldering;
      a bias clip dimensioned to bias a portion of the metallic shield layer to an outer diameter of the metallic shield; and
      placing the metallic shield layer over the metallic shield and over wrapping with a metallic foil.

2. A method for furcating an electro-optical cable with a metallic shield surrounding an electrical conductor and an optical conductor, comprising steps of:
   stripping away a length of the metallic shield from an end of the electro-optical cable;
   inserting the electrical conductor through an electrical conductor furcation tube, the electrical conductor furcation tube comprising: a polymer inner tube; the inner tube surrounded by a metallic shield layer, and a polymer jacket surrounding the metallic shield layer; and
   coupling the metallic shield layer to the metallic shield;
   the method further including the steps of: inserting a transition housing over the end of the electro-optical cable prior to coupling the metallic shield layer to the metallic shield; pulling the transition housing over the coupling between the metallic shield layer and the metallic shield; and filling a cavity between an inner diameter of the transition housing and coupling between the metallic shield layer and the metallic shield with a sealant.

3. The method of claim 2, wherein the filling is through an injection port between the inner diameter and an outer diameter of the transition housing.

4. A method for furcating an electro-optical cable with a metallic shield surrounding an electrical conductor and an optical conductor, comprising steps of:
   stripping away a length of the metallic shield from an end of the electro-optical cable;
   inserting the electrical conductor through an electrical conductor furcation tube, the electrical conductor furcation tube comprising: a polymer inner tube; the inner tube surrounded by a metallic shield layer, and a polymer jacket surrounding the metallic shield layer; and
   coupling the metallic shield layer to the metallic shield;
   wherein the insertion of the electrical conductor is via a pull strand provided in an inner diameter of the inner tube.

* * * * *